Patented Sept. 29, 1931

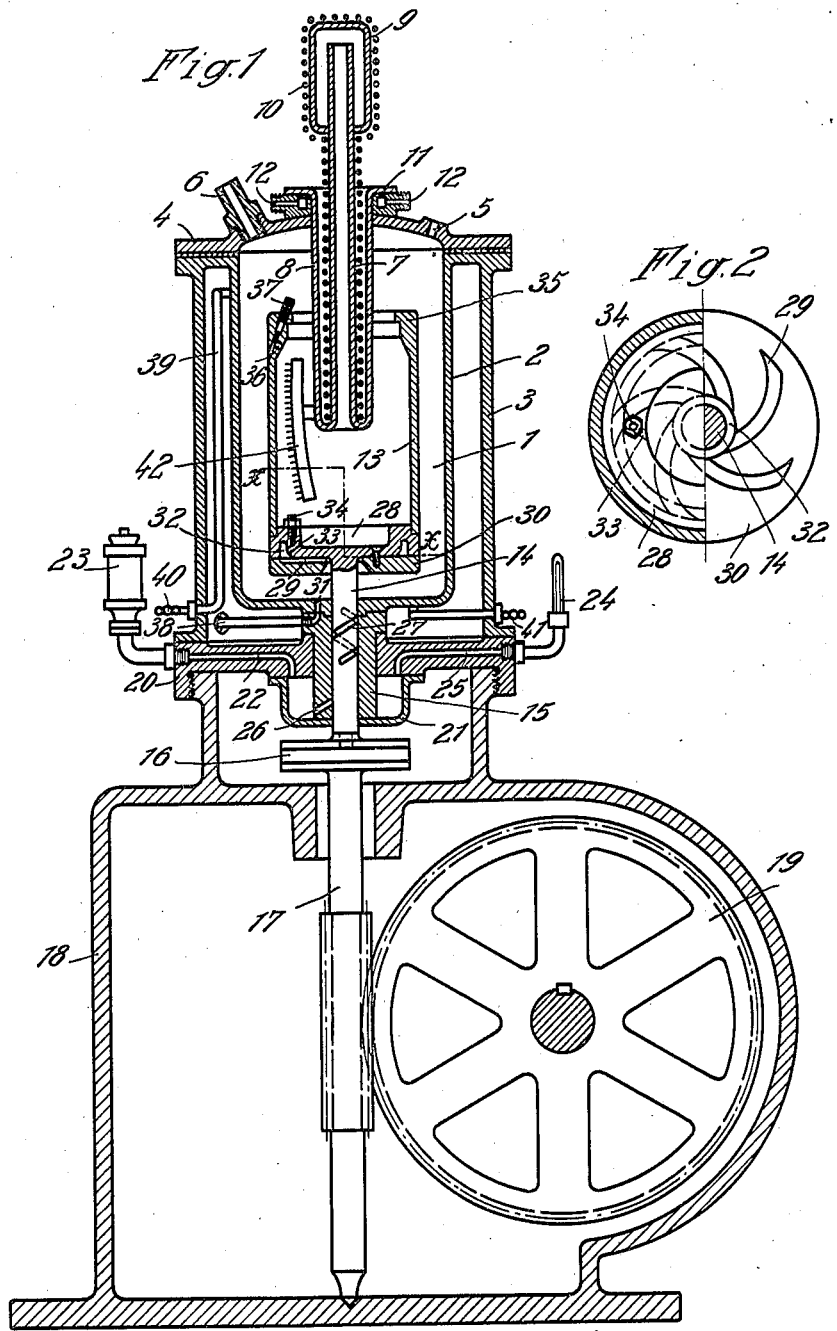

1,825,125

UNITED STATES PATENT OFFICE

MICHAEL POLANYI, OF BERLIN-ZEHLENDORF-MITTE, AND STEPHAN von BOGDANDY, OF BERLIN-DAHLEM, GERMANY

METHOD OF PRODUCING AN INTIMATE MIXTURE OF MUTUALLY INSOLUBLE SUBSTANCES

Application filed February 28, 1928, Serial No. 257,762, and in Germany March 4, 1927. Renewed November 30, 1929.

Our invention relates to a method of producing an intimate mixture of substances.

In the present state of the art there are known various possibilities of producing such mixtures, but their range of application is very limited, because the choice of the substances to be employed is tied down to narrow limits. In the methods of producing alloys, for instance, the production of a fine grained distribution is possible with eutectic mixing proportions only.

The methods of producing colloidal mixtures known at present are applicable for a very limited number of substances only. Bredig's method, for instance, according to which colloidal metal solutions are obtained by atomizing a metal within a liquid by very great electric forces, is not applicable for most organic liquids, because these liquids are not able to withstand the heating which takes place during the atomization of the metal within the liquid. Altogether it may be said that the production of colloidal metal solutions in organic liquids has been successful in rare cases only.

The object of our invention is to extend greatly the possibility of producing intimate mixtures of substances, with regard to the nature of the substances to be employed, as well as in regard to the desired mixing proportions.

According to our improved method described herein not only substances may be used, which have no chemical action upon one another and which, after they have been mixed in a state of fine division, remain in colloidal or true solution unchanged side by side, but also such substances which react chemically upon one another and are after their intimate mixture converted into a new chemical substance into which they can be converted with great difficulty or not at all by known means.

According to our improved method one of the substances to be mixed is converted into a state of fine division. With a second substance which is in the liquid state a free surface is then formed without the aid and independently of the finely divided substance, and lastly the finely divided substance is precipitated upon the said surface. The conversion of the first mentioned substance into the finely divided state may be effected by evaporation, atomization or the like. The electric arc, heating by cathode rays or high frequency eddy currents are preferably employed for this method. The fine distribution may also be effected by the Schoop method, by cathodic atomization or the like.

In order to form surfaces of the liquid substance as large as possible for the reception of the finely divided substance, thin bodies with large free surfaces are preferably formed of the liquid material. This may, for instance, be effected by pouring the liquid into shallow bowls or trays, allowing it to creep along surfaces, passing it in drops or fine jets through a chamber filled with the finely distributed substance, atomizing it by nozzles in the said chamber, and so on.

In order to increase the receptivity of the liquid substance the free surface of this substance and the finely divided substance are moved against each other at a high speed. Preferably the free surface is continually renewed by circulating the liquid in a closed system in communication with a storage tank.

Our improved method is also of great utility for producing chemical combinations from substances, which by the application of the known means can be brought into reaction with difficulty only or not at all. This is the case when the one substance is chemically active in the vaporous, hot state only and the other substance is unable to withstand the temperature of the vapor, for instance, if a hot metal vapor and an organic liquid unable to withstand heat are to be brought into reaction. The methods hitherto employed for producing such chemical combinations differ in each individual case and have the disadvantage in common that they are very expensive and due to their low yield can only be employed for laboratory purposes. The number of the substances of the nature mentioned the chemical combination of which has been successfully carried out up to now is, furthermore, very small.

Our invention provides a method by means of which many substances may be very finely mixed into one another and in proportions as are required for an industrial exploitation. Copper, silver, soot (carbon), metal oxides, for instance, may thus in the form of vapors be combined with organic liquids. If the organic substance is ordinarily in the solid state, it may first be dissolved in an auxiliary liquid, for instance paraffin, and the vapors be precipitated upon this liquid. It is, however, assumed that the solvent is chemically inactive in relation to the vapors. By quickly circulating and cooling the liquid an excessive heating of the organic substances may easily be avoided.

In order to extend our improved method also to such substances which are even in their normal vaporous state not chemically active, the vapors of such substances are converted into the chemically more active state by superheating, electric discharges, by the action of chemical reagents, and thereby the molecular structure or bond of the vapor particles is loosened or dissolved. This additional activation is necessary in the case of substances such as arsenic, antimony, bismuth, sulphur and selenium. In the case of hydrogen the activation by the action of sodium may be employed, whereby free atoms of hydrogen are produced.

For carrying out our improved method an apparatus is preferably used, which comprises means for bringing the first substance into a finely divided state, a receptacle containing a second substance in the liquid state, a revolving body wetted by this liquid substance in the said receptacle, and means for conducting the finely distributed substance towards and against the surface of the said revolving body. In a specific embodiment of our invention the revolving body consists of a drum which is wetted on its inside by a thin layer of the liquid. The drum, the axis of which is preferably located vertically, may be supplied with a continuously renewed quantity of liquid from the store of liquid contained in the said receptacle by means of pump coupled with the lower part of the drum. The liquid is distributed more or less uniformly over the inner surface of the drum and returns into the receptacle through perforations in the upper part of the drum. To cause a certain amount of compression or concentration of the layer of liquid a rim or flange projecting towards the axis is provided at the upper part of the drum. The finely divided substance is conducted into the interior of the drum. For regulating the velocity of the flow of the liquid through the drum adjustable valves are provided in the admission and discharge pipes. Preferably a set of interchangeable drum shells of different taper are provided for the apparatus, to enable the thickness of the layer to be adapted to the service conditions prevailing at the time.

In certain cases it is desirable to cool the liquid, so that it should not become excessively heated by contact with the hot vapors. The container for the liquid substances is evacuated by means of an air pump, to remove all interfering gases. The partial vacuum set up simultaneously facilitates the evaporation and atomization of the one substance.

The drawings affixed hereto and forming part of our specification show an apparatus suitable for carrying out our improved method.

Fig. 1 shows the complete apparatus in longitudinal section through the axis of rotation of the revolving body, and Fig. 2, a detail of this body in section along line X—X of Fig. 1.

Referring to the drawings, 1 is the receptacle or container with the spaced double walls 2, 3 and the cover 4. In the cover is provided a closable opening 5 for filling the liquid substance into the container and an opening 6 with nipple for withdrawing the air by means of an air pump. Into the cover is also inserted in an airtight manner a compound tube consisting of the spaced tubes 7, 8, the inner tube 7 opening at the top into the receptacle 9 for evaporating or atomizing another substance. The receptacle 9 and the inner tube 7 are surrounded by a heating resistance 10. The tight seal between the outer tube 8 and the cover 4 of the receptacle is effected by the stuffing-box 11, which is subject to internal pressure and cooled by passing a liquid under pressure through it through the openings 12.

Within the receptacle 1 is provided the drum 13 supported by the driving shaft 14. The driving shaft sealed by the bottom of the receptacle extends downward and is journaled in the bearing member or bushing 15. It rests by means of an interposed coupling 16 upon the worm shaft 17 supported in the casing 18. The casing also contains the worm wheel 19 driving the worm on the shaft.

The bearing 15 is secured in position by the disc 20 mounted upon the casing 18 and opens at its lower end into the pot 21. This pot communicates through the duct or channel 22 with the storage box 23 for the lubricant, such as oil. The level of the oil may be read off the indicator device 24, which likewise communicates with the pot 21 by a duct 25. The oil penetrates into the bearing 15 through a bore 26 and is distributed in the desired manner by a helical groove 27 in the shaft 14.

In the lower part of the drum 13 is provided the bottom 28 and below this bottom the disc 30 provided with spiral grooves 29 and functioning as centrifugal pump. It draws the liquid through the annular gap 31 from the receptacle, conveys it into the annular channel 32 in the bottom 28 of the drum whence it enters the drum though the bore 33 controlled by the needle valve 34.

The upper edge 35 of the drum is contracted at the top, and provided with outlet openings 36 adapted to be controlled by the adjusting screws 37.

The liquid can be drained out of the receptacle 1 by the pipe 38 communicating with a bore in the bottom of the receptacle. Between the inner and outer walls 2 and 3 of the receptacle are located the cooling coils 39 joined by nipples 40, 41 with water mains.

On the outer central tube 8 is mounted a comb-like member 42 which dips into the layer of liquid with its prongs and causes eddies or whirls in this layer.

The shell of the drum 13 is detachable so that shells of different taper may be mounted upon the bottom 28. In this way the thickness of the layer of liquid wetting the inside of the drum may be conveniently adapted to the various working conditions.

The apparatus functions in the following manner: a substance, such as a metal, which is to be converted into a finely divided state is first introduced into the receptacle 9. Another substance is then introduced into the receptacle 1 through the opening 5. Now the air is withdrawn from the receptacle 1 through the nipple 6 and the receptacle tightly sealed. The drum 13 is then set in rotation by means of the gearing 17, 19 and the heating resistance 10 connected in circuit. Due to the centrifugal force set up by the revolving drum the liquid from the receptacle 1 is raised through the central annular intake of disc 30, the ducts 29, the annular chamber 32 and the bore 33 into the drum where it spreads over the inner surface of the drum in the form of a thin layer. The inwardly projecting edge or rim 35 causes a certain compression or damming up of this layer of liquid and prevents the liquid from being flung out of the drum at the top. Only so much liquid is able to flow out of the drum as the clear area of the openings 36 permits. The velocity of the flow of the liquid can be regulated by the screws 34 and 37.

Against the layer of liquid continuously renewed by circulation from the contents stored in the receptacle are directed the vapors escaping from the receptacle 9 issuing through the central tube 7 opening into the interior of the drum. They are precipitated upon this layer of liquid and become condensed. To prevent excessive heating of the liquid by the heat liberated by the condensation heat is continuously withdrawn from the liquid by the cooling coils 39.

When the liquid in the receptacle 1 has been sufficiently enriched with the substance escaping from the receptacle 9, the apparatus is stopped and the liquid drained out of the receptacle 1 through the pipe 38.

The liquid may, however, equally well be passed continuously through the receptacle 1.

Various modifications and changes may be made without departing from the spirit and the scope of the invention, and we desire, therefore, that only such limitations shall be placed thereon as are imposed by the prior art.

We claim as our invention:

1. The method of producing an intimate mixture of substances, which consists in converting one of said substances in a finely divided state, in a vacuum, forming a free surface of another substance being in the liquid state in the said vacuum, and precipitating the said finely divided substance upon said surface.

2. The method of causing an intimate mixture of substances, consisting in converting one of the substances in vacuo into a hot vapor, in forming in the vacuum a free surface of another substance incapable of withstanding heat being in the liquid state, renewing the surface of said substance in circulation from a store of the liquid substance, precipitating said finely divided substance upon said free surface, and cooling said liquid substance.

3. The method of causing an intimate mixture of solid and liquid substances, and a chemical reaction between said substances, which consists in evaporating said solid substance, forming a free surface of a liquid substance containing another substance in dissolved state, and precipitating said evaporated substance upon said surface, said evaporated substance and said dissolved substance acting chemically upon one another.

4. The method of causing an intimate mixture of substances, and a chemical reaction between said substances, which consists in converting one of the substances in a finely divided state, rendering it chemically active by dissolving the molecular unions of the fine particles, forming a free surface of liquid paraffin containing another substance in a dissolved state, and precipitating the said finely divided substance upon the said surface, the said finely divided substance acting chemically upon said substance dissolved in paraffin.

5. Apparatus for preparing an intimate mixture of substances, comprising means for converting one of said substances in a finely divided state, a receptacle containing another substance in liquid state, a revolving member wetted by said liquid substance in said receptacle, and means for conducting the finely divided substance to the wetted surface of said member.

6. Apparatus for preparing an intimate mixture of substances, comprising means for converting one of said substances in a finely divided state, a receptacle containing another substance in liquid state, a revolving member in said receptacle, means for conducting the liquid in circulation and in a thin layer over the surface of said member, means for evacuating said receptacle and means for conducting said finely divided substance to the wetted surface of said member.

7. Apparatus for preparing an intimate mixture of substances, comprising means for converting one of said substances in a finely divided state, a receptacle containing another substance in liquid state, a revolving drum in said receptacle, means for conducting the liquid of said receptacle in a thin layer to the inner surface of said drum, means for evacuating said receptacle and means for conducting said finely divided substance into the interior of said drum.

8. Apparatus for preparing an intimate mixture of substances, comprising means for converting one of said substances in a finely divided state, a receptacle containing another substance in liquid state, a drum in said receptacle revolving around a substantially vertical axis, a centrifugal pump located in the lower part of said drum and adapted to raise liquid from said receptacle into said drum, means for evacuating said receptacle and means for conducting said finely divided substance into the interior of said drum.

9. Apparatus for preparing an intimate mixture of substances, comprising means for converting one of said substances in a finely divided state, a receptacle containing another substance in liquid state, a drum in said receptacle revolving around a substantially vertical axis, a centrifugal pump located in the lower part of said drum and adapted to raise liquid from said receptacle into said drum, a rim projecting towards the interior of said drum at the top of said drum, overflow openings for the liquid in the drum, means for evacuating said receptacle and means for conducting said finely divided substance into the interior of said drum.

10. Apparatus for preparing an intimate mixture of substances, comprising means for converting one of said substances in a finely divided state, a receptacle containing another substance in liquid state, a drum in said receptacle revolving around a substantially vertical axis, a centrifugal pump located in the lower part of said drum and adapted to raise liquid from said receptacle into said drum, a rim projecting towards the interior of said drum at the top of said drum, overflow openings for the liquid in the drum, valves in the admission and discharge ducts of the drum for controlling the velocity of the flow, means for evacuating said receptacle and means for conducting said finely divided substance into the interior of said drum.

11. Apparatus for preparing an intimate mixture of substances, comprising means for converting one of said substances in a finely divided state, a receptacle containing another substance in liquid state, a revolving drum with a set of exchangeable shells of different taper, means for conducting the liquid of said receptacle in a thin layer to the internal surface of said drum and means for introducing the finely divided substance into said drum.

12. Apparatus for preparing an intimate mixture of substances, comprising means for converting one of said substances in a finely divided state, a receptacle containing another substance in liquid state, a revolving drum in said receptacle, means for conducting the liquid of said receptacle in a thin layer to the inner surface of said drum, members mounted upon the receptacle and dipping into the layer of liquid of said drum, means for evacuating said receptacle and means for conducting said finely divided substance into the interior of said drum.

13. Apparatus for preparing an intimate mixture of substances, comprising means for evaporating one of said substances in vacuo, an evacuated receptacle containing another substance in a liquid state, a revolving member wetted by said liquid substance in said receptacle, and means for conducting the vapors of said first substance to the wetted surface of said revolving member.

14. The method of producing an intimate mixture of liquid and solid substances, which consists in forming a free surface of one of said substances in the liquid state, and precipitating another substance in evaporated form upon said surface.

15. The method of producing an intimate mixture of substances, which consists in forming at lower than atmospheric pressure a free surface of one of said substances in the liquid state, and precipitating another substance in finely divided form upon said surface.

16. The method of causing an intimate mixture of liquid and solid substances, and a chemical reaction between said substances, which consists in forming a free surface of one of said substances in the liquid state, and precipitating another substance in evaporated form upon said surface, the said substances reacting chemically upon one another.

17. The method of producing an intimate mixture of a solid substance with a liquid which consists in evaporating the solid substance, forming of the liquid a thin body with a large free surface, and precipitating the evaporated substance upon the surface of said body.

18. The method of producing an intimate mixture of a solid substance with a liquid which consists in evaporating the solid substance, forming of the liquid a thin body with a large free surface, moving the surface of said liquid and said evaporated substance against each other at a high velocity, and precipitating said evaporated substance upon said surface.

19. The method of producing an intimate mixture of a solid substance with a liquid, which consists in evaporating the solid substance, forming of the liquid a thin body with a large surface of the liquid, precipitating said evaporated substance upon said surface, discharging the liquid body containing the precipitate into a liquid store, and renewing the surface of said body from said liquid store.

In testimony whereof we affix our signatures.

MICHAEL POLANYI.
STEPHAN von BOGDANDY.